US011466615B2

(12) United States Patent
Zhao et al.

(10) Patent No.: US 11,466,615 B2
(45) Date of Patent: Oct. 11, 2022

(54) ENGINE BALANCING SYSTEM (71) Applicant: CHONGQING ZONGSHEN GENERAL POWER MACHINE CO., LTD., Chongqing (CN)

(72) Inventors: Jiwen Zhao, Chongqing (CN); Yichao Wang, Chongqing (CN); Yungang Ma, Chongqing (CN); Fan Hu, Chongqing (CN); Yun Lei, Chongqing (CN)

(73) Assignee: CHONGQING ZONGSHEN GENERAL POWER MACHINE CO., LTD., Chongqing (CN)

(*) Notice: Subject to any disclaimer, the term of this patent is extended or adjusted under 35 U.S.C. 154(b) by 0 days.

(21) Appl. No.: 16/972,619

(22) PCT Filed: Apr. 19, 2019

(86) PCT No.: PCT/CN2019/083460
§ 371 (c)(1),
(2) Date: Dec. 7, 2020

(87) PCT Pub. No.: WO2019/233200
PCT Pub. Date: Dec. 12, 2019

(65) Prior Publication Data
US 2021/0239040 A1    Aug. 5, 2021

(30) Foreign Application Priority Data

Jun. 7, 2018    (CN) .......................... 201810578725.7
Jan. 28, 2019   (CN) .......................... 201910078898.7

(51) Int. Cl.
*F16F 15/26* (2006.01)
*F02B 75/32* (2006.01)
(Continued)

(52) U.S. Cl.
CPC ............ *F02B 75/32* (2013.01); *F16F 15/264* (2013.01); *F02B 2075/1808* (2013.01); *F16F 15/24* (2013.01)

(58) Field of Classification Search
CPC ......... F16C 3/20; F16F 15/283; F16F 15/265; F16F 15/26; F16F 15/264; F16F 15/24;
(Continued)

(56) References Cited

U.S. PATENT DOCUMENTS 3,402,707 A  *  9/1968  Heron .................... F16F 15/264
                                                    123/192.2
6,170,443 B1     1/2001  Mayer
(Continued)

FOREIGN PATENT DOCUMENTS

CN          1220725 A      6/1999
CN          1243188 C      2/2006
(Continued)

*Primary Examiner* — George C Jin
*Assistant Examiner* — Teuta B Holbrook
(74) *Attorney, Agent, or Firm* — Bayramoglu Law Offices LLC (57) ABSTRACT An engine balancing system includes an engine body. At least two slider-crank mechanisms are provided inside the engine body. One of the slider-crank mechanisms is arranged opposite to the other slider-crank mechanism. A slider in one of the slider-crank mechanisms is moved at a speed and acceleration similar to a speed and acceleration of a slider in the other slider-crank mechanism. The slider-crank mechanism includes a connecting rod and a crankshaft with a crank. One end of one of the slider-crank mechanisms and one end of the other slider-crank mechanism are connected to the same crankshaft through the crank. The balancing system can effectively eliminate first-order, second-
(Continued)

order and higher-order vibrations generated during engine operation, thus reducing the probability of equipment damage.

21 Claims, 11 Drawing Sheets

(51) Int. Cl.
*F02B 75/18* (2006.01)
*F16F 15/24* (2006.01)

(58) Field of Classification Search
CPC . F16F 15/267; F16F 15/262; F16F 2230/0011
See application file for complete search history.

(56) References Cited

U.S. PATENT DOCUMENTS

| | | | | |
|---|---|---|---|---|
| 6,382,166 | B1* | 5/2002 | Klika | F02B 75/16 |
| | | | | 123/192.2 |
| 6,732,697 | B1* | 5/2004 | Berger | F16F 7/116 |
| | | | | 123/192.2 |
| 9,228,633 | B2* | 1/2016 | Smies | F16C 3/20 |
| 2003/0183187 | A1* | 10/2003 | Menzel | F16F 15/28 |
| | | | | 123/192.2 |
| 2004/0211383 | A1* | 10/2004 | Koyama | F16F 15/265 |
| | | | | 123/192.2 |
| 2009/0000598 | A1 | 1/2009 | Bach et al. | |
| 2011/0067666 | A1* | 3/2011 | Hashimoto | F02B 75/06 |
| | | | | 123/192.2 |
| 2013/0032116 | A1* | 2/2013 | Aschaber | F16F 15/261 |
| | | | | 123/192.2 |
| 2014/0190442 | A1* | 7/2014 | Saito | F16H 55/18 |
| | | | | 123/192.2 |

FOREIGN PATENT DOCUMENTS

| | | |
|---|---|---|
| CN | 100351506 C | 11/2007 |
| CN | 201293066 Y | 8/2009 |
| CN | 108533402 A | 9/2018 |
| CN | 208564763 U | 3/2019 |
| CN | 109630614 A | 4/2019 |
| EP | 1983215 A1 | 10/2008 |

* cited by examiner

ENGINE BALANCING SYSTEM

CROSS REFERENCE TO THE RELATED APPLICATIONS

This application is the national phase entry of International Application No. PCT/CN2019/083460, filed on Apr. 19, 2019, which is based upon and claims priority to Chinese Patent Application No. 201810578725.7, filed on Jun. 7, 2018; and Chinese Patent Application No. 201910078898.7, filed on Jan. 28, 2019, the entire contents of which are incorporated herein by reference.

TECHNICAL FIELD

The present invention relates to an engine, and more particularly, to an engine balancing system.

BACKGROUND

Vibrations in a reciprocating mechanism, especially in an engine, are typically caused by the unbalanced force generated from the reciprocating motion of the piston(s). During each rotational motion of the crankshaft, the piston is actuated and stopped twice, and the reactions to the forces for accelerating and decelerating the piston are displaced upon the engine body through the crankshaft, causing periodic vibrations within the engine. As engine power increases, so does the frequency and speed of the piston. The amplitude of the vibration becomes larger as well. The same vibration is typically transferred to an operator through a terminal device connected to the engine body, causing unacceptable discomfort for the operator. In applications involving motor vehicles, which require elevated comfort levels, for example, or with respect to compressors with substantial vibration damping requirements, or the field of aero engines, such vibration can result to damage to the engine or associated equipment, thereby reducing engine service life even causing severe accidents.

In the prior art, many engines are equipped with additional pivoting or reciprocating counterweights to reduce vibration.

CN1243188C discloses a balancing device using reciprocating counterweight. The internal combustion engine has a crankcase housing and a cylinder bore for defining the cylinder axis. The patented balancing system includes a crankshaft partially located within the crankcase housing, wherein the cylinder bore is arranged on the first side of the crankshaft; a piston, disposed inside the cylinder bore for reciprocating motions along the cylinder axis in response to the rotational motion of the crankshaft; and a counterweight, disposed on the second side, opposite to the first side, of the crankshaft. The balancing device further includes: a connection arm coupling the counterweight to the crankshaft so that the counterweight reciprocates in response to the rotational motion of the crankshaft; a guide rail interconnected to one of the counterweight and the crankcase housing; and a slot that is formed in the other one of the counterbalance weight and the crankcase housing and receives at least a part of the guide rail so that the guide rail guides the counterweight during the reciprocating motion of the counterweight.

CN100351506 discloses a balance system for a single-cylinder engine that includes a crankshaft, a counterbalance assembly and a groove. The crankshaft includes a crankshaft portion, a crank, a crank pin, and an eccentric flange adjacent to the crank. The counterbalance assembly has a counterbalancing mass portion, a coupling arm, and a pin protruding from a side of the counterbalancing mass portion, wherein the counterbalancing mass portion and the coupling arm are fixed to each other. The coupling arm is supported by the eccentric flange. The groove is configured such that it is capable of receiving the pin, and the pin is capable of sliding along the groove and also rotating within the groove, so that the counterbalance assembly is capable of rotating while moving toward and away from the crankshaft.

The aforementioned patented balancing systems conditionally balance the first-order inertial force, but fail to balance the second-order and higher-order inertial forces that similarly cause engine vibration. Although the second-order and higher-order vibrations have accelerations far less than the first-order vibration, they still cause strong engine vibration. Moreover, the second-order and higher-order vibrations have frequencies closer to the natural frequency of the application terminal, which readily causes the resonance of the application terminal. These forces, therefore, multiply in their intensity and deleterious effects on the engine and the operator. Thus, in the current application scenarios, users have required more than simply eliminating the first-order inertial force.

The prior art only tackles how to reduce the reciprocating vibration of the piston to a certain extent, but does not disclose a solution to further thoroughly eliminate the vibration, especially the second-order and higher-order vibrations.

SUMMARY

An objective of the present invention is to provide an engine balancing system that can effectively eliminate the first-order, second-order and higher-order vibrations resulting from the reciprocating motion of the engine.

The objective of the present invention is achieved by adopting the following technical solution. An engine balancing system includes an engine body. At least two slider-crank mechanisms are provided inside the engine body. One of the slider-crank mechanisms is arranged opposite to the other slider-crank mechanism. A slider in one of the slider-crank mechanisms is moved at a speed and acceleration similar to a speed and acceleration of a slider in the other slider-crank mechanism. The ratio of the speed of the slider in one of the slider-crank mechanisms to the speed of the slider in the other slider-crank mechanism and the ratio of the acceleration of the slider in one of the slider-crank mechanisms to the acceleration of the slider in the other slider-crank mechanism are nearly constant.

The slider-crank mechanism includes a connecting rod and a crankshaft with a crank. The length of the connecting rod of one of the slider-crank mechanisms is $L_1$, and the length of the crank of one of the slider-crank mechanisms is $e_1$. The length of the connecting rod of the other slider-crank mechanism is $L_2$, and the length of the crank of the other slider-crank mechanism is $e_2$. The product of $L_1$ and $e_2$ is $K_1$, and the product of $L_2$ and $e_1$ is $K_2$. The ratio of $K_1$ to $K_2$ ranges from 0.8 to 1.2.

Preferably, the ratio of $K_1$ to $K_2$ is 1:1. The ratio of $K_1$ to $K_2$ of 1:1 is a necessary condition to ensure that the inertial force of a piston assembly and the inertial force of a counterweight are completely balanced. Under this condition, the ratio of the acceleration of the piston assembly to the acceleration of the counterweight when accelerating at a certain phase is constant. At this time, the mass ratio of the piston assembly to the counterweight is controlled to ensure that the inertial force of the piston assembly is always equal to the inertial force of the counterweight, and the net sum of the inertial force of the piston assembly and the inertial force of the counterweight in the certain phase is equal to zero to thoroughly eliminate the reciprocating vibration.

Further, the difference between the phase angle of the crank of one of the slider-crank mechanisms and the phase angle of the crank of the other slider-crank mechanism is 180°±15°.

Preferably, the difference between the phase angles is 180°. When the difference between the phase angles is 180°, the change time of the piston assembly is certain to be the same as that of the counterweight, and the inertial force of the piston assembly and the inertial force of the counterweight at the final phase are always opposite in direction at any time. When the amplitudes of the inertial forces are identical, the net sum of the inertial force of the piston assembly and the inertial force of the counterweight is equal to zero to thoroughly eliminate the reciprocating vibration.

Further, one end of one of the slider-crank mechanisms and one end of the other slider-crank mechanism are connected to the same crankshaft through the crank, to minimize the inertial force acting on the engine body and reduce the stress imposed on the engine body.

In the present invention, one of the slider-crank mechanisms includes a piston assembly and a connecting rod assembly, and the other slider-crank mechanism includes a counterweight, an auxiliary connecting rod A and an auxiliary connecting rod B. The piston assembly is connected to the crankshaft through the connecting rod assembly. Both ends of the counterweight are connected to the crankshaft through the auxiliary connecting rod A and the auxiliary connecting rod B, respectively. The auxiliary connecting rod A and the auxiliary connecting rod B are separately located on both sides of the connecting rod assembly. One end of the counterweight is connected to the engine body through a guiding column mechanism.

In order to further eliminate vibration caused by the design of an eccentric piston, the hinge center of the piston assembly and the connecting rod assembly is $O_1$, and the hinge center of the counterweight and the auxiliary connecting rod A or the counterweight and the auxiliary connecting rod B is $O_2$. $O_1$ and $O_2$ are distributed on both sides of the axis of the motion of the piston assembly.

In order to further eliminate the vibration caused by torque, the axis of the motion of the piston assembly and the axis of rotation of the crank form a plane $S_1$. In a single-cylinder engine, the plane $S_2$ passes through the axis of the motion of the piston and is perpendicular to the axis of the crankshaft. In a two-cylinder engine, the plane $S_2$ bisects the axis of the motion of the piston and is perpendicular to the axis of the crankshaft. The center of mass of the counterweight is located within the radius of 10 mm around the intersection of the plane $S_1$ and the plane $S_2$ to minimize additional torque.

In order to eliminate the reciprocating inertial force through a simple linear motion law, when the slider-crank mechanisms oppositely arranged move with accelerations, the motion acceleration of the piston assembly is approximately the same as the motion acceleration of the counterweight.

Preferably, the motion acceleration of the piston assembly is identical to the motion acceleration of the counterweight. At this time, the condition to thoroughly eliminate the reciprocating vibration is satisfied.

In the present invention, the counterweight is connected to the auxiliary connecting rod A and the auxiliary connecting rod B in the following manner. A connecting lug A and a connecting lug B are separately provided at both ends of the counterweight, the connecting lug A is connected to the lower end of the auxiliary connecting rod A arranged inside the connecting lug A by a connecting pin, and the connecting lug B is connected to the lower end of the auxiliary connecting rod B arranged inside the connecting lug B by another connecting pin.

Further, the guiding column mechanism includes a guiding column A and a guiding column B. The guiding column A and the guiding column B are located on the same side of the counterweight, and the counterweight is sleeved on the guiding column A and the guiding column B. The lower end of the guiding column A and the lower end of the guiding column B are connected to the lower part of the engine body. The upper end of the guiding column A and the upper end of the guiding column B are connected to a positioning mechanism arranged inside the engine body.

In the present invention, the cross-sections of the guiding column A and the guiding column B are configured in a circular or rectangular shape to facilitate the manufacturing and assembling process while ensuring accuracy.

Further, the axis of the motion of the piston assembly and the axis of the rotation of the crank form the plane $S_1$, and the guiding column mechanism is located on both sides of $S_1$.

The guiding column mechanism restricts all the rotational degrees of freedom of the counterweight, such that the counterweight has only one degree of freedom in the motion direction.

The guiding column A and the guiding column B are positioned and supported by two pivots, respectively. The counterweight is sleeved on the guiding column A and the guiding column B, and moves between the two pivots of the guiding column A and the guiding column B.

The positioning mechanism includes a positioning lug A with a positioning hole and a positioning lug B with a positioning hole, which are arranged inside the engine body. The upper end of the guiding column A passes through the positioning hole of the positioning lug A, and the upper end of the guiding column B passes through the positioning hole of the positioning lug B.

Further, the engine body includes an engine casing with a casing cover. The at least two oppositely arranged slider-crank mechanisms are arranged inside the engine casing. One end of one of the slider-crank mechanisms and one end of the other slider-crank mechanism are connected to the same crankshaft through the crank. The two ends of one of the slider-crank mechanisms are separately connected to the casing cover and the engine casing through a guide mechanism.

One of the slider-crank mechanisms includes a piston assembly and a connecting rod assembly, and the other slider-crank mechanism includes a counterweight, an auxiliary connecting rod A and an auxiliary connecting rod B. The piston assembly is connected to the crankshaft through the connecting rod assembly. Both ends of the counterweight are connected to the crankshaft through the auxiliary connecting rod A and the auxiliary connecting rod B, respectively. The auxiliary connecting rod A and the auxiliary connecting rod B are separately located on both sides of the connecting rod assembly. Both ends of the counterweight are separately connected to the inner wall of the casing cover and the inner wall of the engine casing through a guide mechanism.

In the present invention, the guide mechanism is further described as follows. The guide mechanism includes a guide rail A and a guide rail B that are arranged at both ends of the counterweight and are integrally arranged with the counterweight, as well as a slide groove A that is arranged on the inner wall of the casing cover, and a slide groove B that is arranged on the inner wall of the engine casing. The guide rail A is located inside the slide groove A and slides up and down, and the guide rail B is located inside the slide groove B and slides up and down.

In order to facilitate the connection, the counterweight is connected to the auxiliary connecting rod A and the auxiliary connecting rod B in the following manner. The guide rail A is connected to the lower end of the auxiliary connecting rod A by a connecting pin, and the guide rail B is connected to the lower end of the auxiliary connecting rod B by another connecting pin.

Further, the guide mechanism can also be arranged in the following configuration. The guide mechanism includes a slide groove mechanism A and a slide groove mechanism B that are arranged at both ends of the counterweight and are integrally arranged with the counterweight, as well as a guide rail C matched with the slide groove mechanism A and arranged on the inner wall of the casing cover and a guide rail D matched with the slide groove mechanism B and arranged on the inner wall of the engine casing.

The slide groove mechanism A includes a slide groove C and a slide groove D that are arranged on both sides of one end of the counterweight, as well as a slide groove E and a slide groove F that are arranged on both sides of the other end of the counterweight. The guide rail C is engaged with the slide groove C and the slide groove D, and the guide rail D is engaged with the slide groove E and the slide groove F.

By means of the above technical solutions, the present invention has the advantages of ingenious structural design, reliable use and low cost, whereby the first-order, second-order and higher-order vibrations generated during engine operation can be effectively eliminated, thus reducing the equipment damage probability, and improving the user experience. Moreover, the configuration of the guiding column mechanism and the auxiliary connecting rod paves the way for the elimination of second-order and higher-order vibrations, solves the problem of the space occupied by the engine casing by reducing the overall size of the engine, and improves the service life of the engine.

DETAILED DESCRIPTION OF THE EMBODIMENTS

The specific embodiments of the present invention will be further described in detail below with reference to the drawings, but the present invention is not limited to these embodiments. Any improvement or substitution within the basic spirit of these embodiments still belongs to the scope of protection claimed by the claims of the present invention.

Embodiment 1

Figure 1:
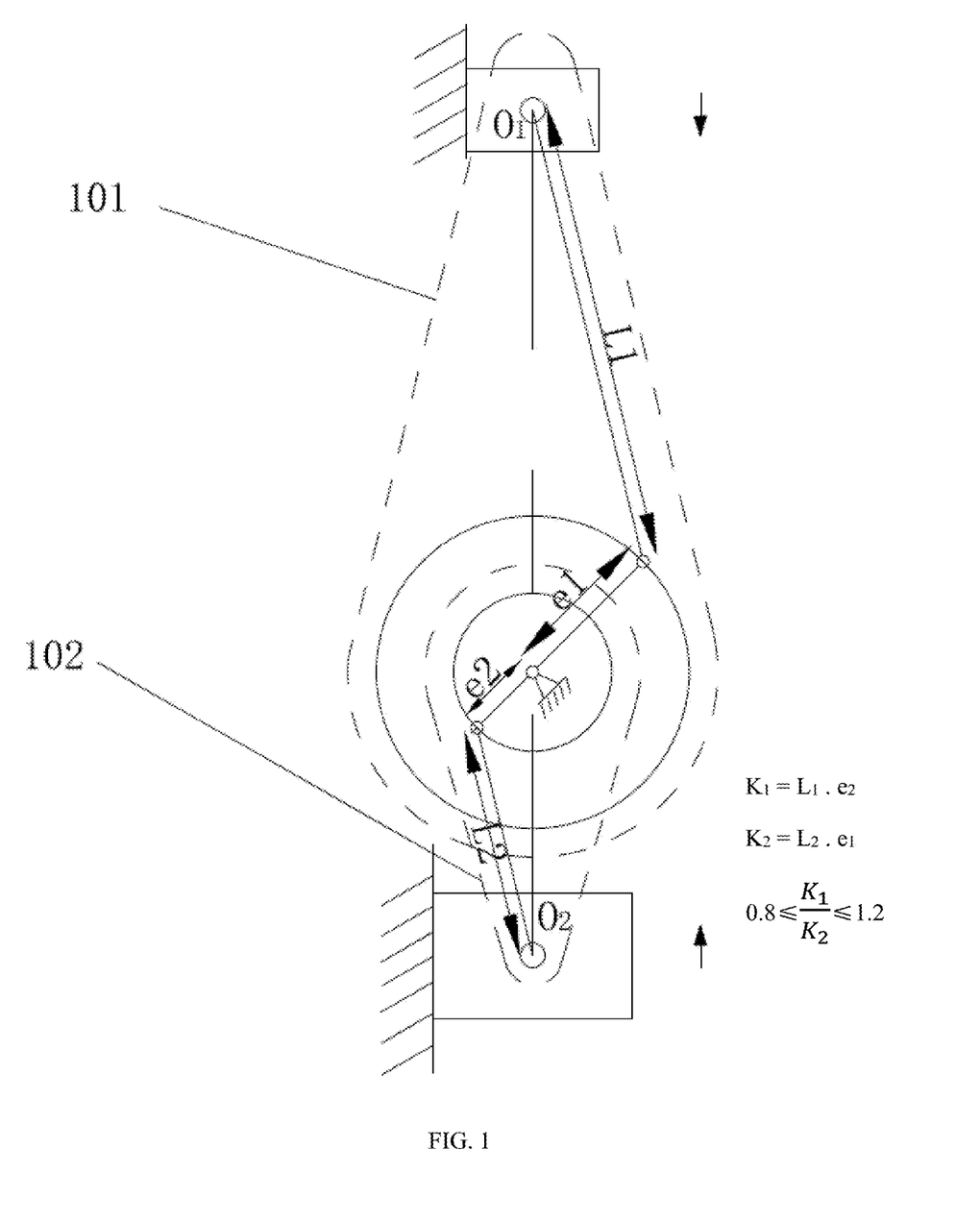
FIG. 1 is a structural schematic diagram of the motion trajectory according to the present invention.
Figure 2:
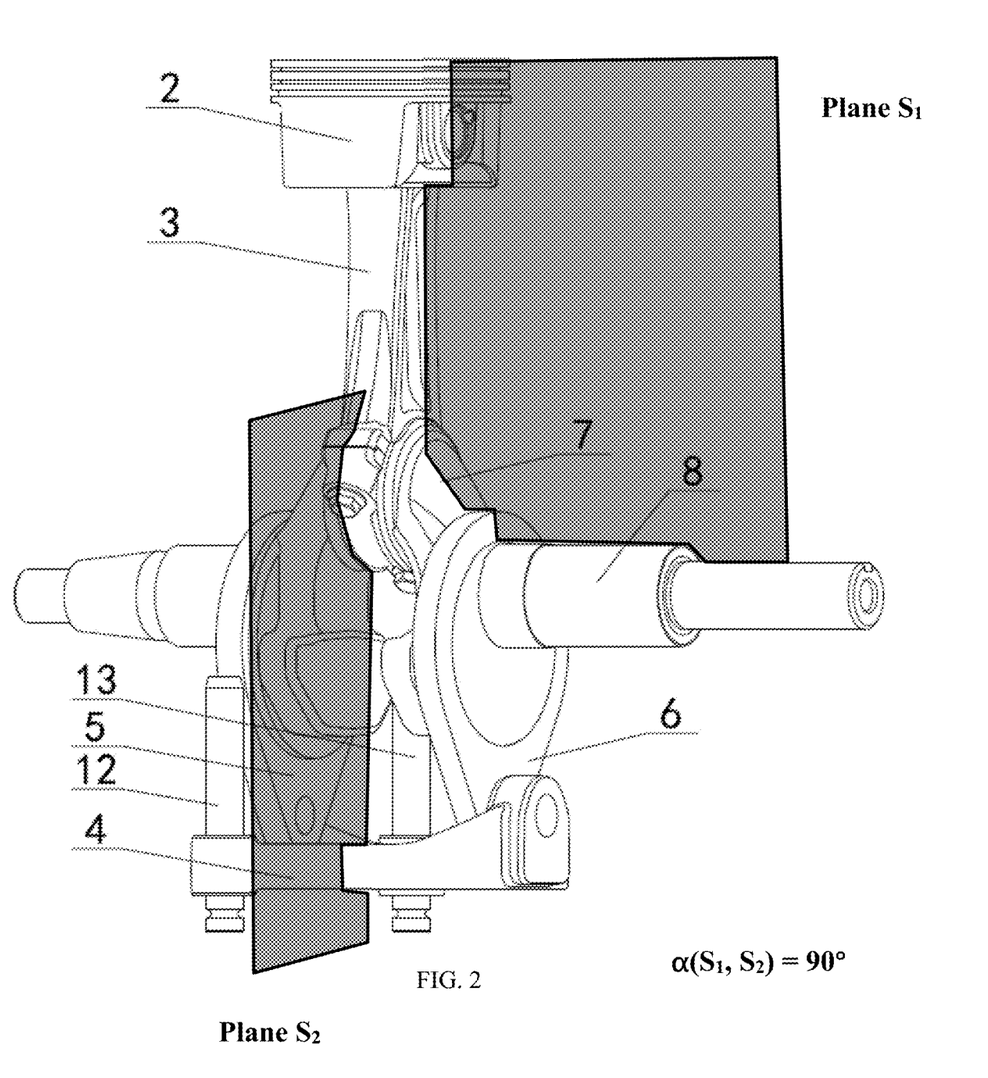
FIG. 2 is a perspective view of the first structure of the slider-crank mechanism according to the present invention.
Figure 3:
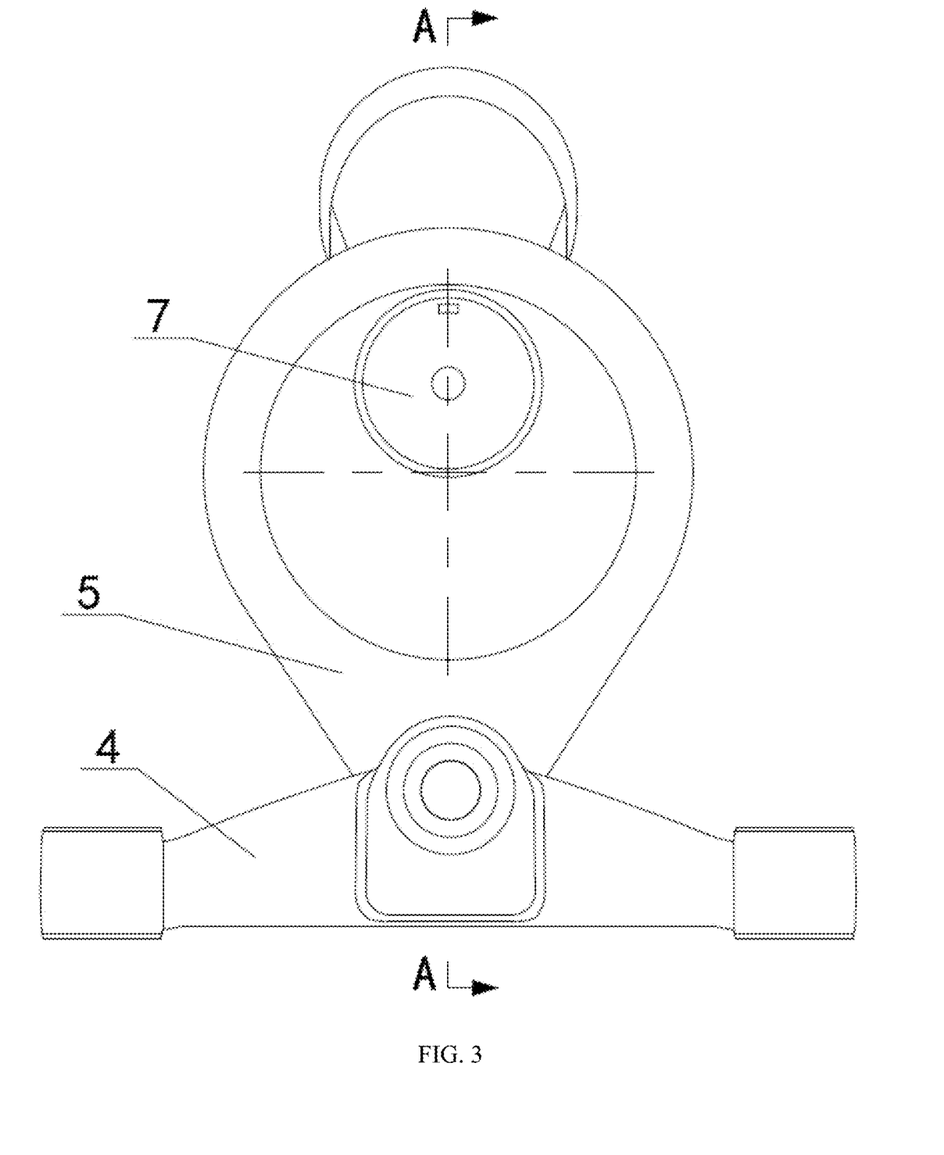
FIG. 3 is a schematic side view of the structure of the slider-crank mechanism according to the present invention.

As shown in FIGS. 1-3, an engine balancing system includes an engine body. At least two slider-crank mechanisms 101 and 102 are provided inside the engine body. The slider-crank mechanism 101 is arranged opposite to the slider-crank mechanism 102. A slider in one of the slider-crank mechanisms is moved at a speed and acceleration similar to a speed and acceleration of a slider in the other slider-crank mechanism. The ratio of the speed of the slider in one of the slider-crank mechanisms to the speed of the slider in the other slider-crank mechanism and the ratio of the acceleration of the slider in one of the slider-crank mechanisms to the acceleration of the slider in the other slider-crank mechanism are approximately constant.

In order to improve the effect of eliminating the vibration, the slider-crank mechanism includes a connecting rod connecting with the crank 7 of the crankshaft 8. The length of the connecting rod of the slider-crank mechanism 101 is $L_1$, and the length of the crank of the slider-crank mechanism 101 is $e_1$. The length of the connecting rod of the slider-crank mechanism 102 is $L_2$, and the length of the crank of the slider-crank mechanism 102 is $e_2$. The product of $L_1$ and $e_2$ is $K_1$, and the product of $L_2$ and $e_1$ is $K_2$. The ratio of $K_1$ to $K_2$ ranges from 0.8 to 1.2.

In the present invention, the ratio of $K_1$ to $K_2$ is preferably 1:1.

Further, in order to enhance the effect of eliminating the vibration, the difference between the phase angle of the crank of one of the slider-crank mechanisms and the phase angle of the crank of the other slider-crank mechanism is 180°±15°.

In the present invention, one end of one of the slider-crank mechanisms and one end of the other slider-crank mechanism are connected to the same crankshaft through the crank.

Figure 4:
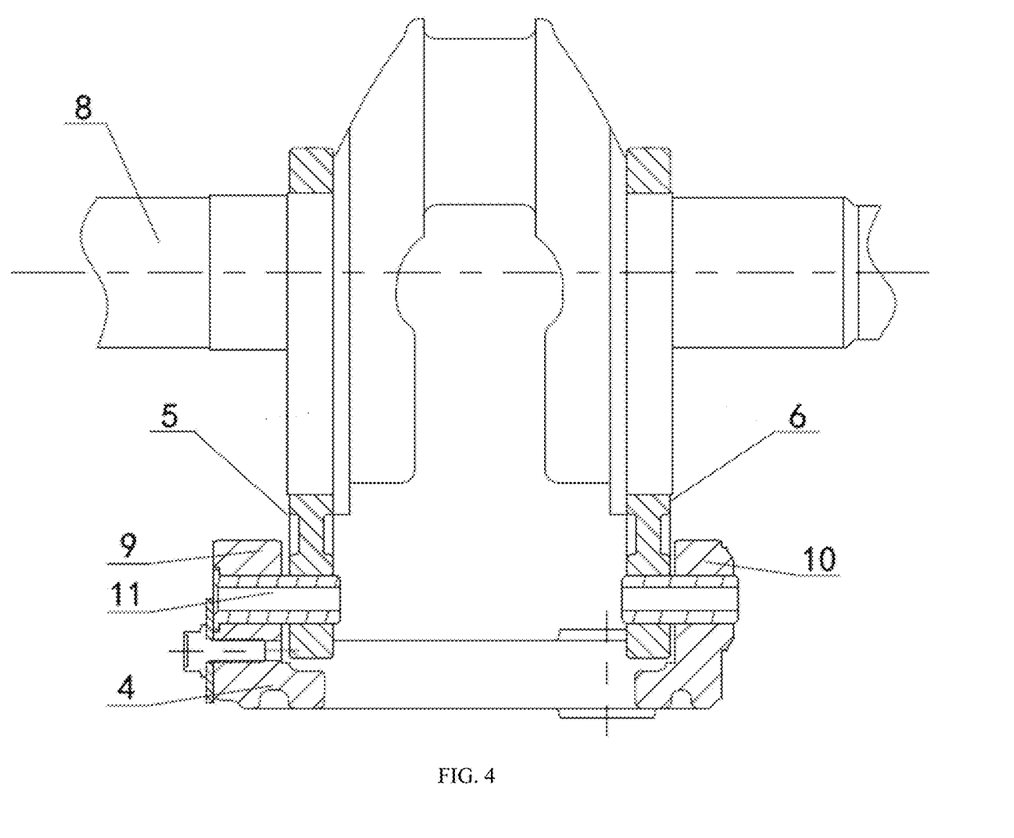
FIG. 4 is a cross-sectional view taken along arrow A-A of FIG. 3.
Figure 5:
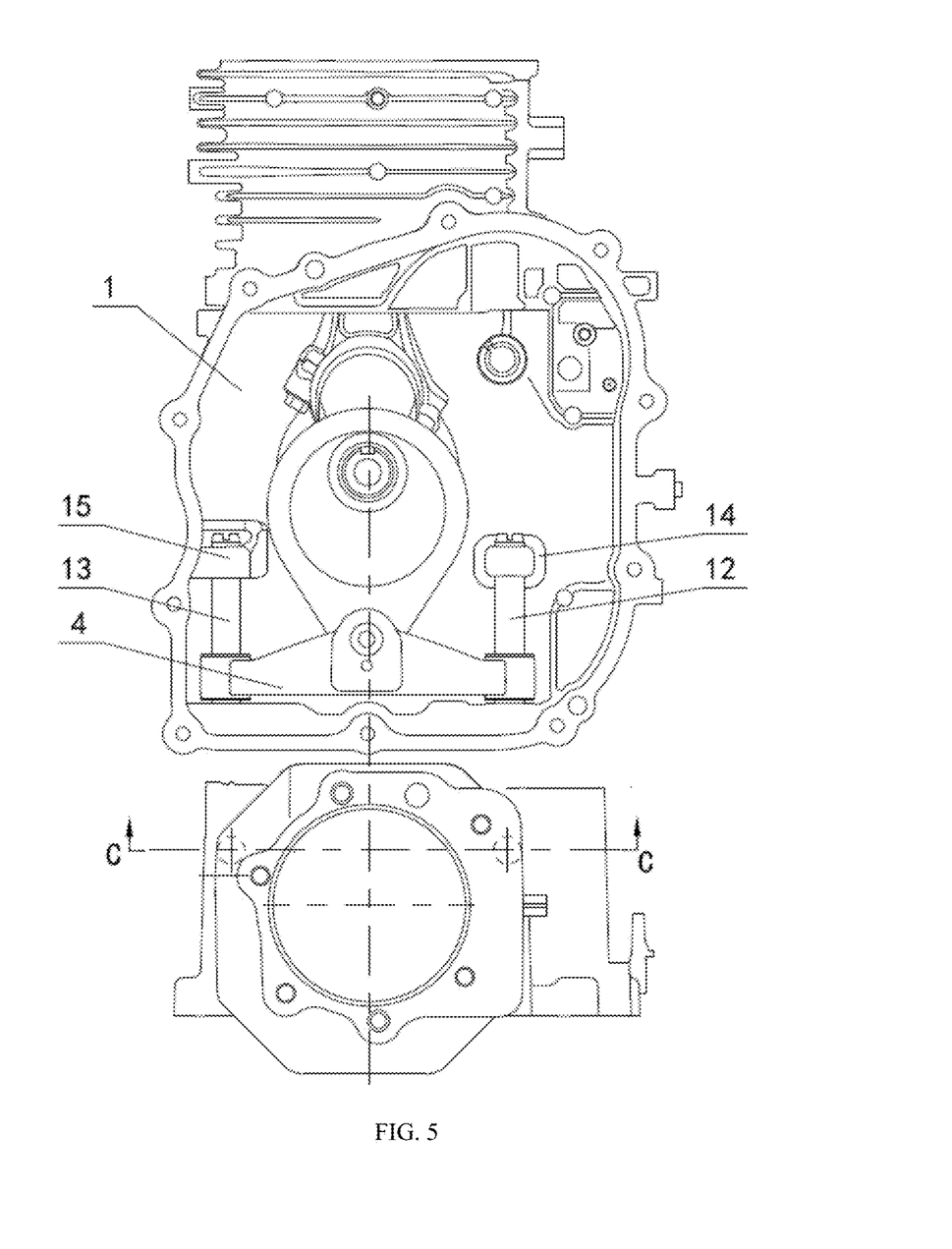
FIG. 5 is a schematic diagram of the overall structure of the engine according to the present invention.
Figure 6:
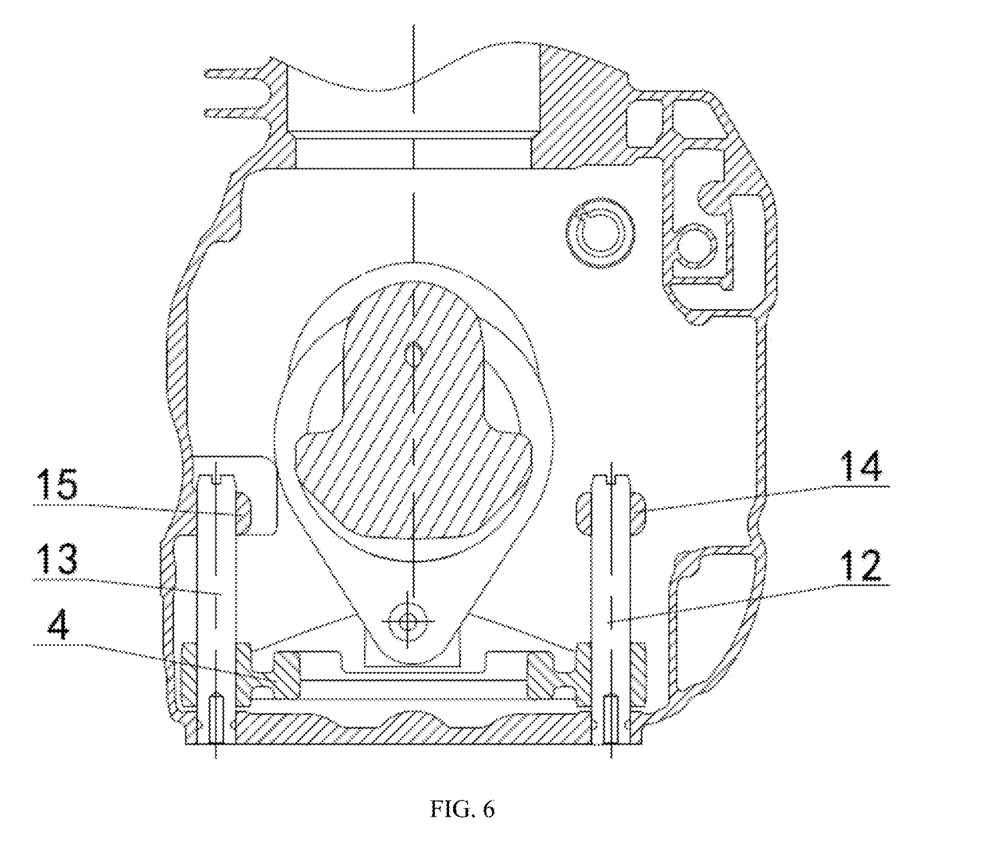
FIG. 6 is a cross-sectional view taken along arrow C-C of FIG. 5.

As shown in FIGS. 4-6, further, one of the slider-crank mechanisms includes the piston assembly 2 and the connecting rod assembly 3, and the other slider-crank mechanism includes the counterweight 4, the auxiliary connecting rod A 5 and the auxiliary connecting rod B 6. The piston assembly 2 is connected to the crankshaft 8 through the connecting rod assembly 3. Both ends of the counterweight 4 are connected to the crankshaft 8 through the auxiliary connecting rod A 5 and the auxiliary connecting rod B 6, respectively. The auxiliary connecting rod A 5 and the auxiliary connecting rod B 6 are separately located on both sides of the connecting rod assembly 3. One end of the counterweight 4 is connected to the engine body 1 through a guiding column mechanism.

In order to satisfy the requirement of eliminating the reciprocating inertial force through a simple linear motion law, when the slider-crank mechanisms arranged oppositely move with acceleration, the motion acceleration of the piston assembly 2 is approximately the same as the motion acceleration of the counterweight 4.

Preferably, the motion acceleration of the piston assembly 2 is identical to the motion acceleration of the counterweight 4. At this time, the condition to completely eliminate the reciprocating vibration is satisfied.

In order to further reduce the vibration, when the slider-crank mechanisms arranged oppositely move with acceleration, the motion trajectory of the piston assembly 2 away from and close to the top and bottom dead centers is proportionally the same as the motion trajectory of the counterweight 4 away from and close to the top and bottom dead centers.

Further, the hinge center of the piston assembly 2 and the connecting rod assembly 3 is $O_1$, and the hinge center of the counterweight 4 and the auxiliary connecting rod A 5 or the counterweight 4 and the auxiliary connecting rod B 6 is $O_2$. $O_1$ and $O_2$ are distributed on both sides of the axis of the motion of the piston assembly.

In order to further eliminate the vibration generated during engine operation, the axis of the motion of the piston assembly 2 and the axis of the rotation of the crank form the plane S The guiding column mechanism is located on both sides of S1.

Further, in order to facilitate assembly and reduce space and size, the connecting lug A 9 and the connecting lug B 10 are separately provided at both ends of the counterweight 4. The connecting lug A 9 is connected to the lower end of the auxiliary connecting rod A 5 arranged inside the connecting lug A 9 by the connecting pin 11, and the connecting lug B 10 is connected to the lower end of the auxiliary connecting rod B 6 arranged inside the connecting lug B 10 by another connecting pin 11.

The guiding column mechanism includes the guiding column A 12 and the guiding column B 13. The guiding column A 12 and the guiding column B 13 are located on the same side of the counterweight 4, and the counterweight 4 is sleeved on the guiding column A 12 and the guiding column B 13. The lower end of the guiding column A 12 and the lower end of the guiding column B 13 are connected to the lower part of the engine body 1. The upper end of the guiding column A 12 and the upper end of the guiding column B 13 are connected to a positioning mechanism arranged inside the engine body 1.

The guiding column A 12 and the guiding column B 13 are positioned and supported by two pivots, respectively. The counterweight is sleeved on the guiding column A 12 and the guiding column B 13, and moves between the two pivots of the guiding column A 12 and the guiding column B 13.

Further, the positioning mechanism includes the positioning lug A 14 with a positioning hole and the positioning lug B 15 with a positioning hole, which are arranged inside the engine body 1. The upper end of the guiding column A 12 passes through the positioning hole of the positioning lug A 14, and the upper end of the guiding column B 13 passes through the positioning hole of the positioning lug B 15.

Further, the guiding column mechanism restricts all the rotational degrees of freedom of the counterweight 4, and only retains the freedom of movement of the counterweight 4 in one direction. When the two sliders arranged oppositely inside the engine balancing system move away from and close to the top and bottom dead centers, where the accelerations of the two sliders are proportionally the same.

In the present invention, the cross-sections of the guiding column A 12 and the guiding column B 13 are configured in a circular or rectangular shape to facilitate the manufacturing and assembling process and ensuring accuracy.

In the present invention, the rotary motion of the crankshaft 8 drives the connecting rod assembly 3, the auxiliary connecting rod A 5, and the auxiliary connecting rod B 6 to execute planar motion to realize the reciprocating motion of the counterweight 4 on the guiding column A 12 and the guiding column B 13, and forces resulting from the reciprocating motion of the piston assembly 2 are balanced to eliminate accompanying undesirable engine vibrations. In the present invention, the auxiliary connecting rod A 5 and the auxiliary connecting rod B 6 are configured to better guide and position the counterweight 4, thereby avoiding or reducing the occurrence of other vibrations, which effectively reduces the vibration generated during the operation of the single-cylinder engine improves the customer experience due to the smooth operation of the engine and also improves the service life of the engine.

The present invention can effectively balance the first-order, second-order and higher-order forces resulting from the reciprocating motion of the engine piston to improve the vibration generated during the operation of the engine.

Further, the hinge center of the piston assembly 2 and the connecting rod assembly 3 is $O_1$, and the hinge center of the counterweight 4 and the auxiliary connecting rod A 5 or the counterweight 4 and the auxiliary connecting rod B 6 is $O_2$. $O_1$ and $O_2$ are distributed on both sides of the axis of motion of the piston assembly 2. In this way, the vibration under the design of an eccentric piston is eliminated.

In order to further eliminate the vibration caused by torque, the axis of the motion of the piston assembly 2 and the axis of the rotation of the crank form the plane $S_1$. In a single-cylinder engine, the plane $S_2$ passes through the axis of motion of the piston and is perpendicular to the axis of the crankshaft. In a two-cylinder engine, the plane $S_2$ bisects the axis of the motion of the piston and is perpendicular to the axis of the crankshaft. The center of mass of the counterweight is located within the radius of 10 mm around the intersection of the plane $S_1$ and the plane $S_2$ to minimize additional torque.

Preferably, when the position of the center of mass is located at the intersection of the plane $S_1$ and the plane $S_2$, the additional torque is satisfied to be zero to achieve the optimal effect of eliminating the vibration.

In the present invention, the engine is not limited to a single-cylinder engine, optionally, the engine may also be an in-line two-cylinder engine.

Embodiment 2

Figure 7:
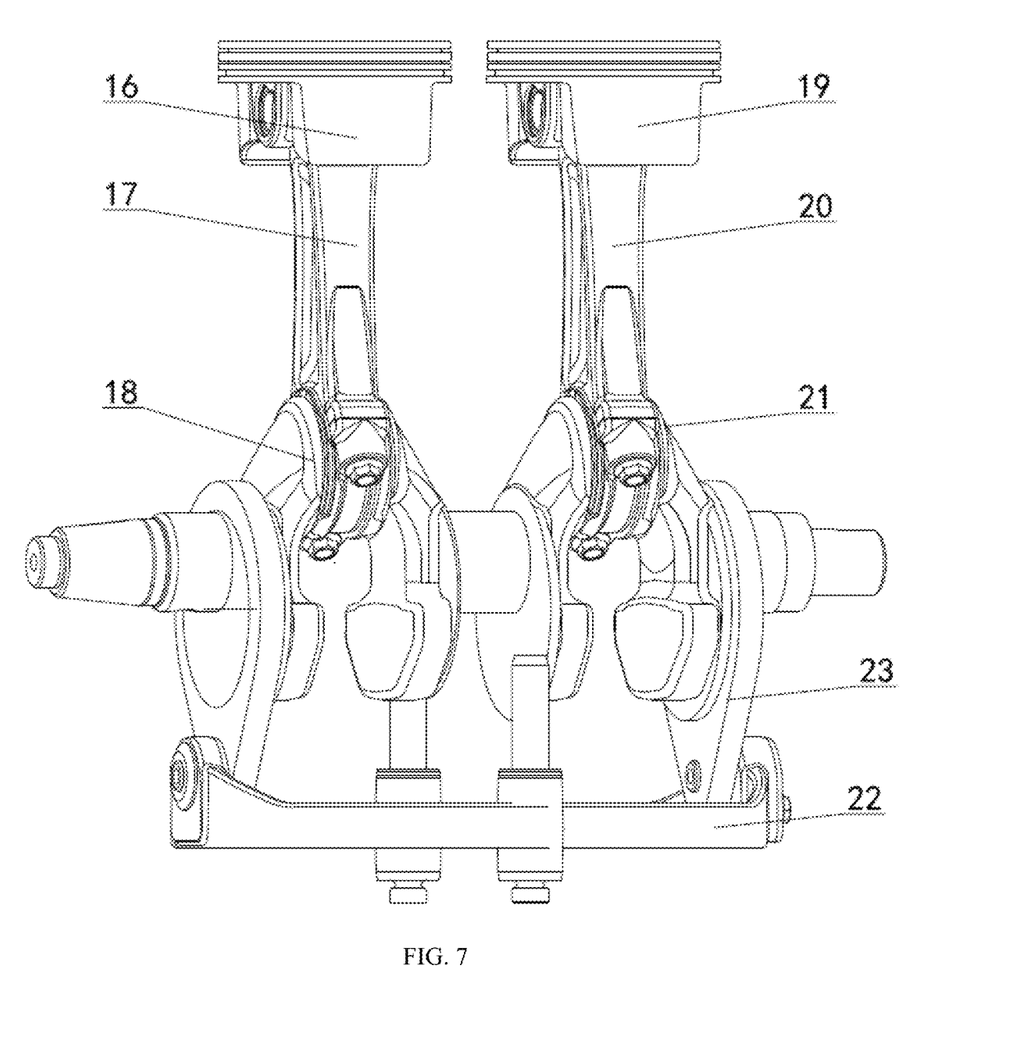
FIG. 7 is a schematic diagram of the structure of the inline two-cylinder engine according to Embodiment 2.

As shown in FIG. 7, in the engine balancing system, when the engine is an in-line two-cylinder engine, the balancing system is composed of a first slider-crank mechanism, a second slider-crank mechanism, and a third slider-crank mechanism. The first slider-crank mechanism includes the first cylinder piston 16, the first cylinder connecting rod 17, and the first cylinder crank 18 that drives the first cylinder piston 16 to move. The second slider-crank mechanism includes the second cylinder piston 19, the second cylinder connecting rod 20, and the second cylinder crank 21 that drives the second cylinder piston 19 to move. The third slider-crank mechanism includes the counterweight 22, the auxiliary connecting rod 23, and a third crank that drives the counterweight 22 to move. The first slider-crank mechanism and the second slider-crank mechanism are arranged opposite to the third slider-crank mechanism. The hinge centers of all revolute pairs inside the first slider-crank mechanism are connected to form a first triangle. The hinge centers of all revolute pairs inside the second slider-crank mechanism are connected to form a second triangle. The hinge centers of all revolute pairs inside the third slider-crank mechanism are connected to form a third triangle. The first, second, and third triangles have the same normal vector. The plane S is perpendicular to the normal vector, and the projections of the first, second, and third triangles on the plane S are the first projection triangle, the second projection triangle, and the third projection triangle, respectively. The first projection triangle and the second projection triangle are congruent triangles and overlapped. The first projection triangle is approximately the same as the third projection triangle. The length of the connecting rod and the length of the crank in the oppositely arranged slider-crank mechanisms satisfy the characteristics of Embodiment 1.

Figure 8:
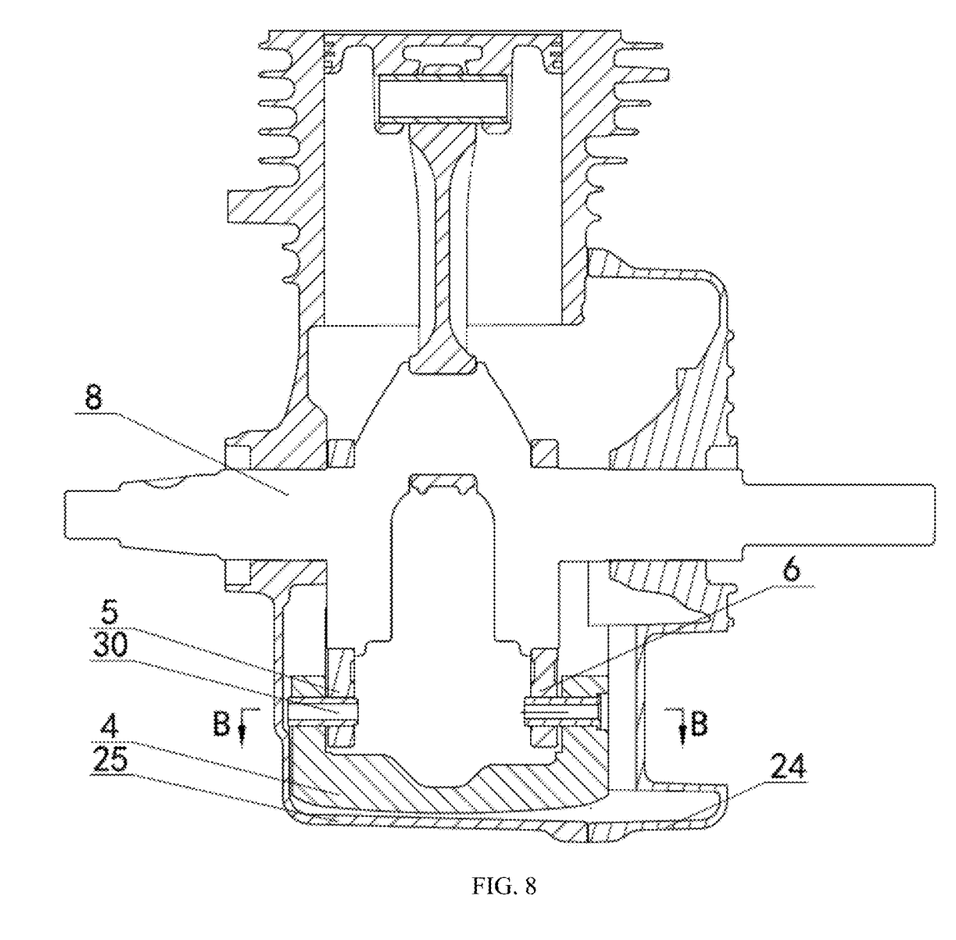
FIG. 8 is a cross-sectional view of the present invention.
Figure 9:
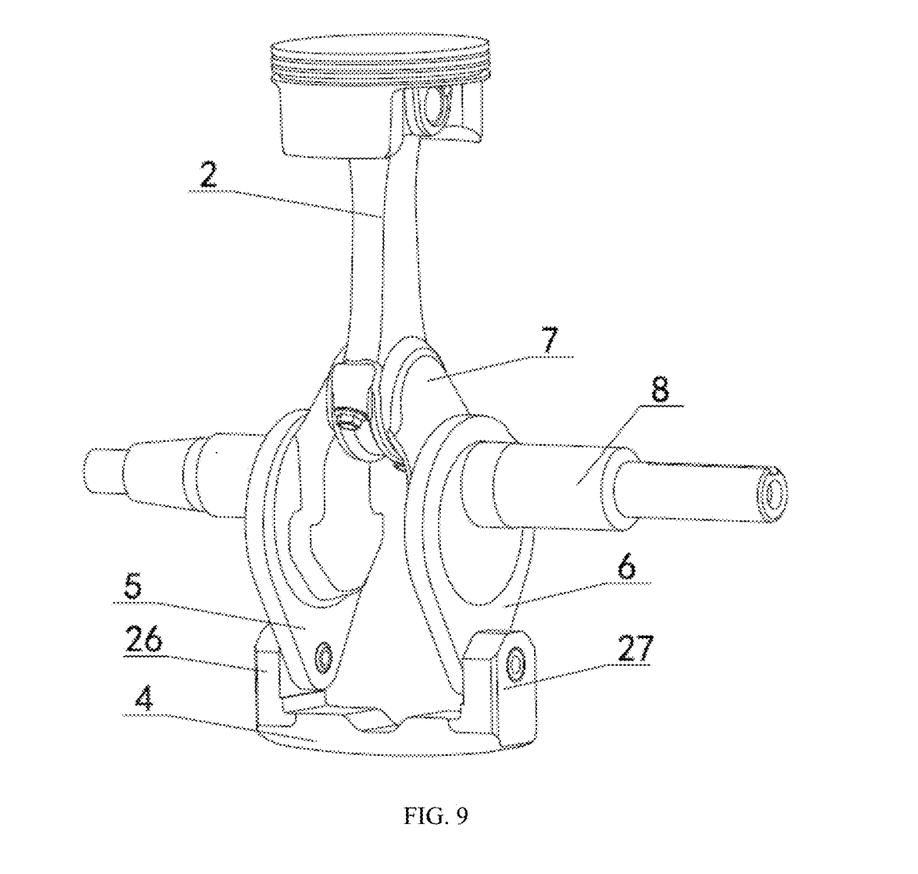
FIG. 9 is a perspective view of the second structure of the slider-crank mechanism of the present invention.

Further, as shown in FIG. 8 and FIG. 9, the engine body includes the engine casing 25 with the casing cover 24. The at least two oppositely arranged slider-crank mechanisms are arranged inside the engine casing. One end of one of the slider-crank mechanisms and one end of the other slider-crank mechanism are connected to the same crankshaft 8 through the crank 7. The two ends of one of the slider-crank mechanisms are separately connected to the casing cover 24 and the engine casing 25 through a guide mechanism.

One of the slider-crank mechanisms includes the piston assembly 2 and the connecting rod assembly 3, and the other slider-crank mechanism includes the counterweight 4, the auxiliary connecting rod A 5 and the auxiliary connecting rod B 6. The piston assembly 2 is connected to the crankshaft 8 through the connecting rod assembly 3 and the crank 7. Both ends of the counterweight 4 are connected to the crankshaft 8 through the auxiliary connecting rod A 5 and the auxiliary connecting rod B 6, respectively. The auxiliary connecting rod A 5 and the auxiliary connecting rod B 6 are separately located on both sides of the connecting rod assembly 3. Both ends of the counterweight 4 are separately connected to the inner wall of the casing cover 24 and the inner wall of the engine casing 25 through a guide mechanism.

Embodiment 3

Figure 10:
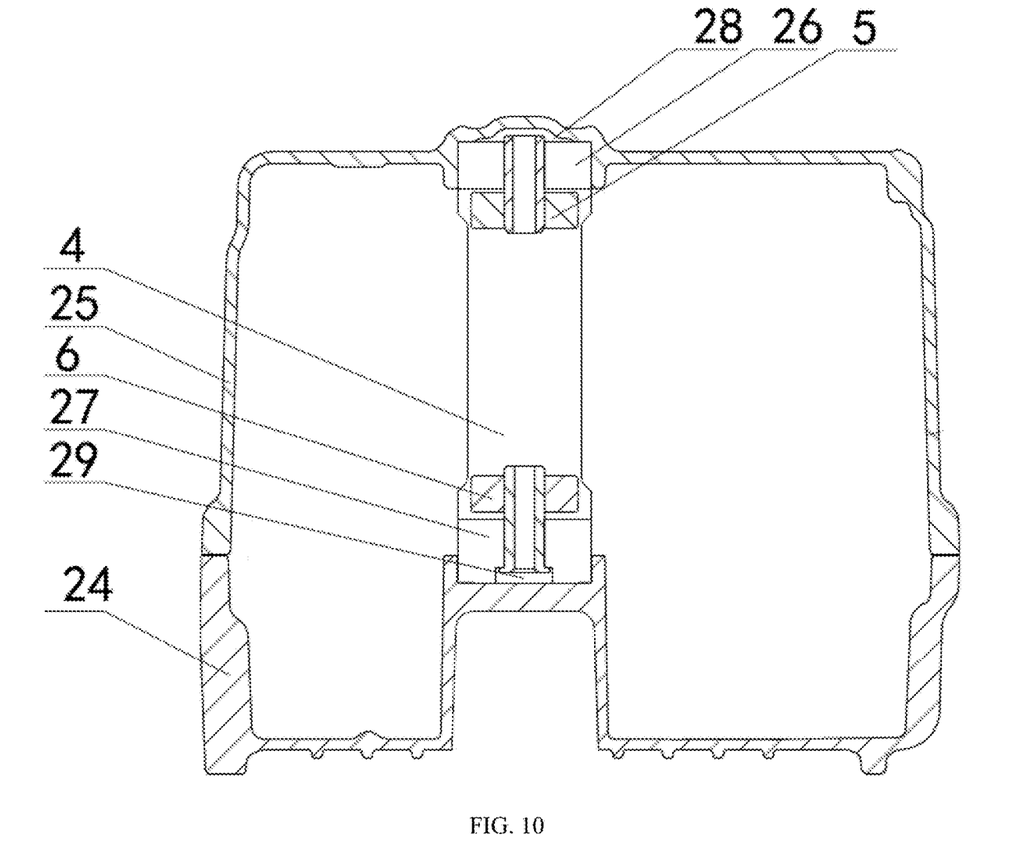
FIG. 10 is a cross-sectional view of the first structure taken along arrow B-B in FIG. 8.

As shown in FIG. 10, the guide mechanism includes the guide rail A 26 and the guide rail B 27 that are arranged at both ends of the counterweight 4 and are integrally arranged with the counterweight 4, as well as the slide groove A 28 that is arranged on the inner wall of the casing cover 24, and the slide groove B 29 that is arranged on the inner wall of the engine casing 25. The guide rail A 26 is located inside the slide groove A 28 and slides up and down, and the guide rail B 27 is located inside the slide groove B 29 and slides up and down.

In order to facilitate the connection, the guide rail A 26 is connected to the lower end of the auxiliary connecting rod A 5 by the connecting pin 30, and the guide rail B 27 is connected to the lower end of the auxiliary connecting rod B 6 by another connecting pin 30.

In the present invention, the rotary motion of the crankshaft drives the connecting rod assembly 3, the auxiliary connecting rod A 5, and the auxiliary connecting rod B 6 to execute planar motion to realize the reciprocating motion of the counterweight 4 in the slide groove A 28 and the slide groove B 29, and forces resulting from the reciprocating motion of the piston assembly 2 are balanced to ensure its linear motion and eliminate accompanying undesirable engine vibrations. In the present invention, the auxiliary connecting rod A 5 and the auxiliary connecting rod B 6 are configured to better guide and position the counterweight 4, thereby avoiding or reducing the other vibrations, which effectively improves the vibration generated during the operation of the single-cylinder engine, and improves the customer experience by ensuring the smooth operation of the engine. In this way, the service life of the engine is improved.

Embodiment 4

Figure 11:
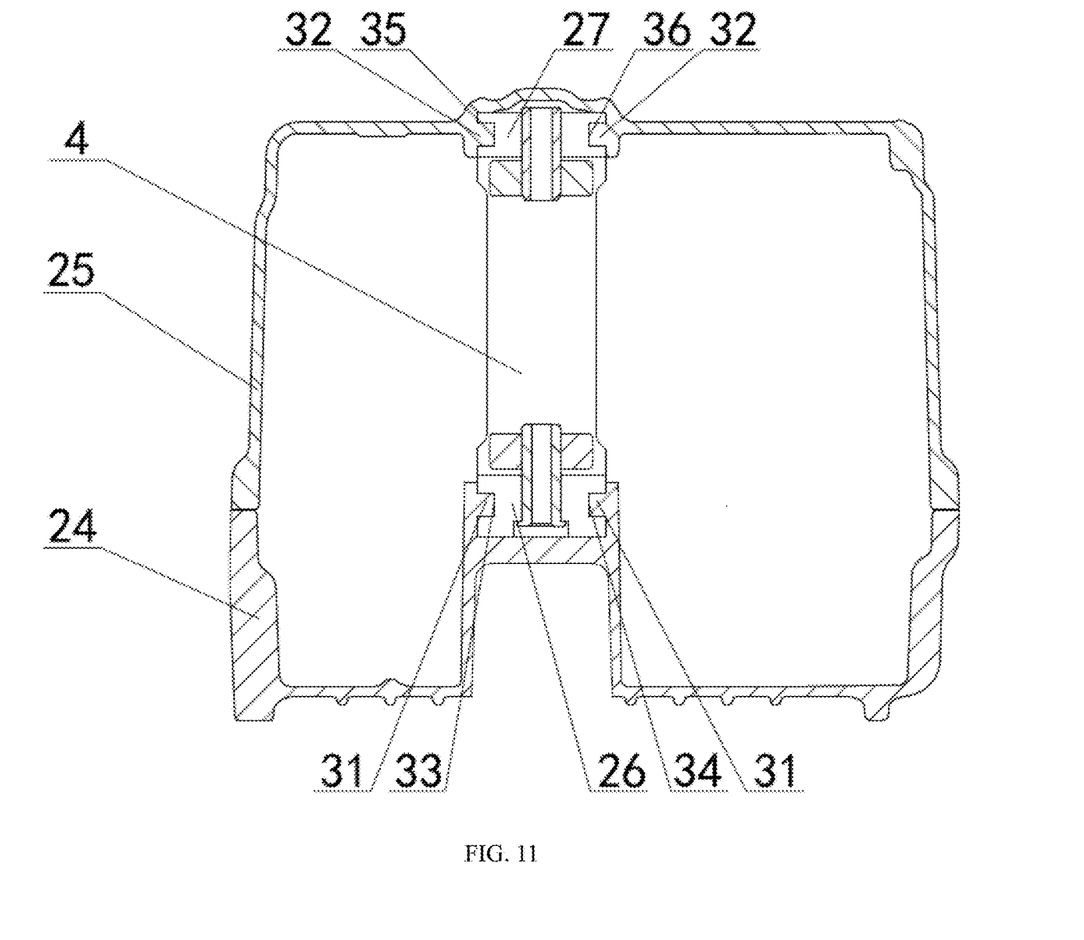
FIG. 11 is a cross-sectional view of the second structure taken along arrow B-B in FIG. 8.

As shown in FIG. 11, the guide mechanism includes the slide groove mechanism A and the slide groove mechanism B that are arranged at both ends of the counterweight 4 and are integrally arranged with the counterweight 4, as well as the guide rail C 31 that is matched with the slide groove mechanism A and arranged on the inner wall of the casing cover 24, and the guide rail D 32 that is matched with the slide groove mechanism B and arranged on the inner wall of the engine casing 25.

The slide groove mechanism A includes the slide groove C 33 and the slide groove D 34 that are arranged on both sides of one end of the counterweight 4, as well as the slide groove E 35 and the slide groove F 36 that are arranged on both sides of the other end of the counterweight 4. The guide rail C 31 is engaged with the slide groove C 33 and the slide groove D 34, and the guide rail D 32 is engaged with the slide groove E 35 and the slide groove F 36.

What is claimed is:

1. An engine balancing system, comprising:
an engine body;
wherein at least two slider-crank mechanisms are provided inside the engine body;
a first slider-crank mechanism of the at least two slider-crank mechanisms is arranged opposite to a second slider-crank mechanism of the at least two slider-crank mechanisms;
the first slider-crank mechanism and the second slider-crank mechanism connected via a crank;
a slider in the first slider-crank mechanism is moved at a speed and an acceleration similar to a speed and an acceleration of a slider in the second slider-crank mechanism;
a ratio of the speed of the slider in the first slider-crank mechanism to the speed of the slider in the second slider-crank mechanism and a ratio of the acceleration of the slider in the first slider-crank mechanism to the acceleration of the slider in the second slider-crank mechanism are approximately constant;
wherein each slider-crank mechanism of the at least two slider-crank mechanisms comprises a connecting rod connected to the crank, and a crankshaft connected to the crank is shared between the at least two slider-crank mechanisms;
a length of the connecting rod of the first slider-crank mechanism is $L_1$, and a length of the crank of the first slider-crank mechanism is $e_1$;
a length of the connecting rod of the second slider-crank mechanism is $L_2$, and a length of the crank of the second slider-crank mechanism is $e_2$;
a product of $L_1$ and $e_2$ is $K_1$, and a product of $L_2$ and $e_1$ is $K_2$; and
a ratio of $K_1$ to $K_2$ ranges from 0.8 to 1.2.

2. The engine balancing system according to claim 1, wherein, $L_1$ does not equal $L_2$ and $e_1$ does not equal $e_2$.

3. The engine balancing system according to claim 2, wherein,
the ratio of $K_1$ to $K_2$ is 1:1.

4. The engine balancing system according to claim 2, wherein,
- a difference between a phase angle of the crank of the first slider-crank mechanism and a phase angle of the crank of the second slider-crank mechanism is 180°±15°.

5. The engine balancing system according to claim 4, wherein,
- a first end of the first slider-crank mechanism and one end of the second slider-crank mechanism are connected to the crankshaft through the crank of the first slider-crank mechanism and the crank of the second slider-crank mechanism.

6. The engine balancing system according to claim 5, wherein,
- the first slider-crank mechanism comprises a piston assembly and a connecting rod assembly, and the second slider-crank mechanism comprises a counterweight, a first auxiliary connecting rod and a second auxiliary connecting rod;
- wherein the piston assembly is connected to the crankshaft through the connecting rod assembly;
- both ends of the counterweight are connected to the crankshaft through the first auxiliary connecting rod and the second auxiliary connecting rod, respectively;
- the first auxiliary connecting rod and the second auxiliary connecting rod are separately located on both sides of the connecting rod assembly; and
- one end of the both ends of the counterweight is connected to the engine body through a guiding column mechanism.

7. The engine balancing system according to claim 6, wherein,
- a hinge center of the piston assembly and the connecting rod assembly is $O_1$, and a hinge center of the counterweight and the first auxiliary connecting rod or the counterweight and the second auxiliary connecting rod is $O_2$; and
- $O_1$ and $O_2$ are distributed on both sides of an axis of motion of the piston assembly.

8. The engine balancing system according to claim 7, wherein,
- the axis of the motion of the piston assembly and an axis of rotation of the crank form a plane $S_1$;
- in a single-cylinder engine, a plane $S_2$ passes through the axis of the motion of the piston assembly and is perpendicular to an axis of the crankshaft;
- in a two-cylinder engine, the plane $S_2$ bisects the axis of the motion of the piston assembly and is perpendicular to the axis of the crankshaft; and
- a center of mass of the counterweight is located within a radius of 10 mm around an intersection of the plane $S_1$ and the plane $S_2$.

9. The engine balancing system according to claim 8, wherein,
- when the slider in the first slider-crank mechanism and the slider in the second slider-crank mechanism move with the acceleration, a ratio of a motion acceleration of the piston assembly to a motion acceleration of the counterweight is approximately constant.

10. The engine balancing system according to claim 9, wherein,
- a first connecting lug and a second connecting lug are separately provided at the both ends of the counterweight,
- the first connecting lug is connected to a lower end of the first auxiliary connecting rod arranged inside the first connecting lug by a first connecting pin, and
- the second connecting lug is connected to a lower end of the second auxiliary connecting rod arranged inside the second connecting lug by a second connecting pin.

11. The engine balancing system according to claim 10, wherein,
- the guiding column mechanism comprises a first guiding column and a second guiding column;
- the first guiding column and the second guiding column are located on one side of the counterweight, and the counterweight is sleeved on the first guiding column and the second guiding column;
- a lower end of the first guiding column and a lower end of the second guiding column are connected to a lower part of the engine body;
- an upper end of the first guiding column and an upper end of the second guiding column are connected to a positioning mechanism arranged inside the engine body.

12. The engine balancing system according to claim 11, wherein,
- a cross-section of the first guiding column and a cross-section of the second guiding column are circular or rectangular.

13. The engine balancing system according to claim 11, wherein,
- the axis of the motion of the piston assembly and the axis of the rotation of the crank form the plane $S_1$, and
- the guiding column mechanism is located on both sides of the plane $S_1$.

14. The engine balancing system according to claim 11, wherein,
- the first guiding column and the second guiding column are positioned and supported by two pivots, respectively;
- the counterweight is sleeved on the first guiding column and the second guiding column, and
- the counterweight moves between the two pivots of the first guiding column and the second guiding column.

15. The engine balancing system according to claim 11, wherein
- the positioning mechanism comprises a first positioning lug with a positioning hole and a second positioning lug with a positioning hole, wherein the first positioning lug and the second positioning lug are arranged inside the engine body;
- the upper end of the first guiding column passes through the positioning hole of the first positioning lug, and
- the upper end of the second guiding column passes through the positioning hole of the second positioning lug.

16. The engine balancing system according to claim 5, wherein,
- the engine body comprises an engine casing with a casing cover;
- the at least two slider-crank mechanisms are arranged inside the engine casing;
- the first end of the first slider-crank mechanism and the end of the second slider-crank mechanism are connected to the crankshaft through the crank of the first slider-crank mechanism and the crank of the second slider-crank mechanism;
- the first end of the first slider-crank mechanism is connected to the casing cover through a guide mechanism, and a second end of the first slider-crank mechanism is connected to the engine casing through the guide mechanism.

17. The engine balancing system according to claim 16, wherein,
- the first slider-crank mechanism comprises a piston assembly and a connecting rod assembly, and the second slider-crank mechanism comprises a counterweight, a first auxiliary connecting rod and a second auxiliary connecting rod;
- the piston assembly is connected to the crankshaft through the connecting rod assembly;
- both ends of the counterweight are connected to the crankshaft through the first auxiliary connecting rod and the second auxiliary connecting rod, respectively;
- the first auxiliary connecting rod and the second auxiliary connecting rod are separately located on both sides of the connecting rod assembly;
- the both ends of the counterweight are separately connected to an inner wall of the casing cover and an inner wall of the engine casing through the guide mechanism.

18. The engine balancing system according to claim 17, wherein,
- the guide mechanism comprises a first guide rail, a second guide rail, a first slide groove, and a second slide groove, wherein the first guide rail and the second guide rail are arranged at the both ends of the counterweight and are integrally arranged with the counterweight,
- the first slide groove is arranged on the inner wall of the casing cover, and the second slide groove is arranged on the inner wall of the engine casing;
- the first guide rail is located inside the first slide groove and slides up and down, and
- the second guide rail is located inside the second slide groove and slides up and down.

19. The engine balancing system according to claim 18, wherein,
- the first guide rail is connected to a lower end of the first auxiliary connecting rod by a first connecting pin, and
- the second guide rail is connected to a lower end of the second auxiliary connecting rod by a second connecting pin.

20. The engine balancing system according to claim 17, wherein,
- the guide mechanism comprises a first slide groove mechanism and a fourth guide rail, wherein the first slide groove mechanism and the second slide groove mechanism are arranged at the both ends of the counterweight and are integrally arranged with the counterweight,
- the third guide rail is matched with the first slide groove mechanism and arranged on the inner wall of the casing cover, and
- the fourth guide rail is matched with the second slide groove mechanism and arranged on the inner wall of the engine casing.

21. The engine balancing system according to claim 20, wherein
- the first slide groove mechanism comprises a third slide groove, a fourth slide groove, a fifth slide groove and a sixth slide groove, wherein the third slide groove and the fourth slide groove are arranged on both sides of a first end of the both ends of the counterweight,
- the fifth slide groove and the sixth slide groove are arranged on both sides of a second end of the both ends of the counterweight;
- the third guide rail is engaged with the third slide groove and the fourth slide groove, and the fourth guide rail is engaged with the fifth slide groove and the sixth slide groove.

* * * * *